United States Patent [19]

Jacobsen et al.

[11] Patent Number: 4,631,675
[45] Date of Patent: Dec. 23, 1986

[54] AUTOMATIC LIGHT-INTENSITY CONTROL

[75] Inventors: William F. M. Jacobsen, Blaine, Minn.; Zoltan Zansky, Willowdale, Canada

[73] Assignee: Honeywell Inc., Minneapolis, Minn.

[21] Appl. No.: 632,786

[22] Filed: Jul. 20, 1984

[51] Int. Cl.[4] ............................................. G06F 15/20
[52] U.S. Cl. ..................... 364/400; 364/148; 364/480; 364/551; 364/571; 362/32; 362/227; 362/276; 362/802
[58] Field of Search ........................ 364/400, 480–481, 364/483, 488–489, 492, 551, 556, 570–571, 148, 152; 362/32, 85, 145–147, 150, 153, 227, 233, 235–236, 257, 260, 276, 801–802

[56] References Cited

U.S. PATENT DOCUMENTS

| | | | |
|---|---|---|---|
| 3,898,643 | 8/1975 | Ettlinger | 364/480 X |
| 4,001,571 | 1/1977 | Martin | 362/147 X |
| 4,141,056 | 2/1979 | Neely | 362/145 X |
| 4,241,295 | 12/1980 | Williams, Jr. | 364/400 X |
| 4,281,365 | 7/1981 | Elving et al. | 362/145 X |
| 4,383,288 | 5/1983 | Hess, II et al. | 362/32 |
| 4,392,187 | 7/1983 | Bornhorst | 364/400 X |
| 4,511,824 | 4/1985 | Goddard | 364/480 X |
| 4,538,218 | 8/1985 | Watson | 362/802 |

Primary Examiner—Gary V. Harkcom
Attorney, Agent, or Firm—Charles G. Mersereau

[57] ABSTRACT

An illumination sensing and light level control system for an area of interest includes a light collector to collect and focus light from a relatively large portion of the area of interest, a light-sensitive array including a matrix of light-intensity sensitive elements for receiving light collected and focused by the collector, a multiplexer and signal conditioner for processing and digitizing the light intensity values, a microprocessor for processing the digitized data and controlling the operation and control functions of the system, and a controller for controlling the light level of one or more lamps or sets of lamps associated with the area of interest. A calibration device is used to generate the desired matrix values for comparison.

8 Claims, 1 Drawing Figure

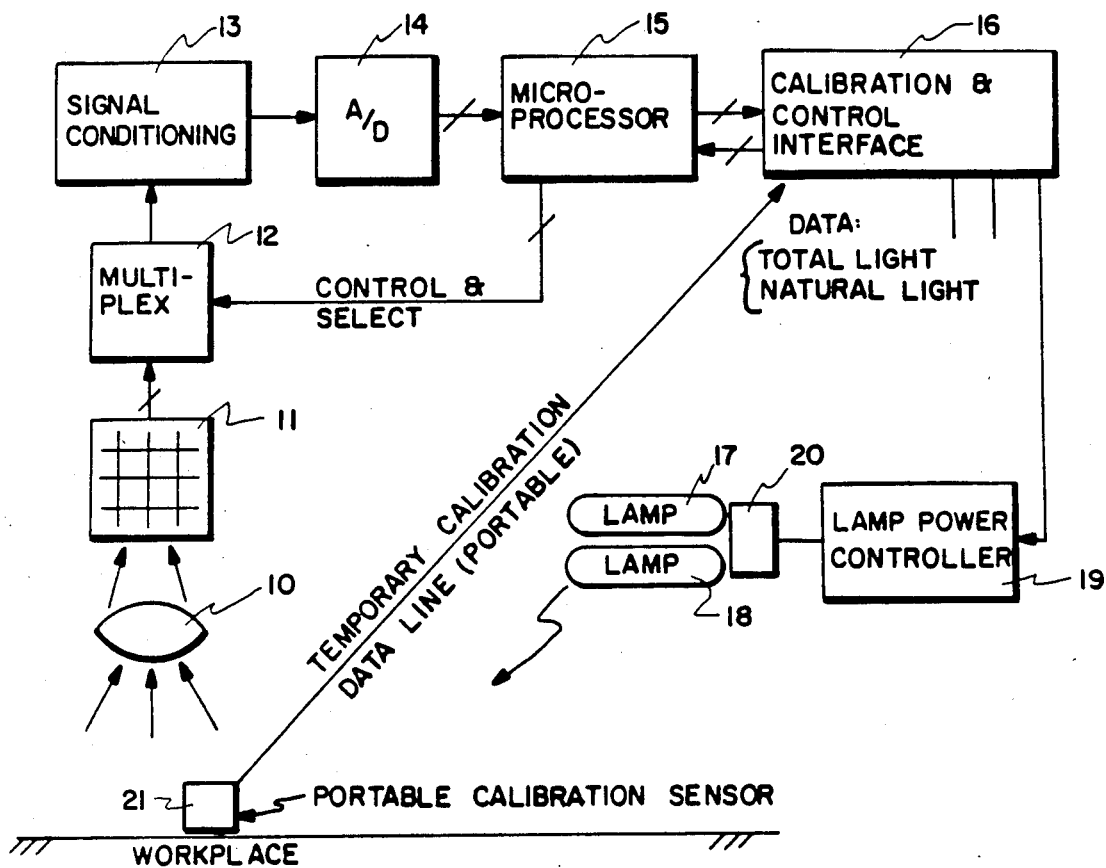

AUTOMATIC LIGHT-INTENSITY CONTROL

BACKGROUND OF THE INVENTION

The present invention relates generally to automatic light-intensity controls and, more particularly, to an improved light-intensity control system which compensates for "hot-spots", maintains proper lighting contrast, provides easy calibration/recalibration and eliminates lighting zone "cross-talk".

In the prior art various attempts have been made to automatically control the lighting level in buildings and offices or the like. These systems generally utilize a light-level sensing device to sense the ambient light level operated in conjunction with a control device. The level of artificial lighting in the controlled space is modulated in response to the sensed light level to maintain a constant total illumination level. While these devices have met with some success, they suffer from several drawbacks.

The prior art light sensors normally treat the entire controlled space as a unit and, therefore, are sensitive to areas of the illuminated space which, although small, appear much brighter to the light-level sensor. These are known as "hot-spots". If the sensor observes and responds to these hot-spots, this causes the lamps to dim over the whole conditioned space which results in a lower than desirable light level in much of the space. In addition, with the prior art devices there is generally no way to provide contrast maintenance over the entire conditioned space which is an important aspect of good lighting. Also, with the prior art devices, adjacent lighting zones frequently are coupled together. Thus, when one zone increases its lighting level in response to decreased total illumination sensed, others detect the increase and interpret this increase in their zone as a call for less lighting. This is known as "cross-talk" and is undesirable because it may cause undue dimming in portions of the conditioned space.

SUMMARY OF THE INVENTION

By means of the present invention there is provided an automatic light-intensity control having an expanded capability which overcomes many of the drawbacks associated with prior art systems. The illumination sensing and controlling system of the present invention includes a light collecting system which draws light from a relatively large area of the conditioned space and focuses the light on a two-dimensional, light-sensitive array which, in effect, maps the conditioned space into a two-dimensional matrix. A multiplexer, a set of signal conditioning electronics and a microprocessor are provided along with a control interface device which controls the power controller for the lamps, normally a dimmable ballast.

The multiplexer sequentially reads the light intensity value of each sensor array element into the signal conditioning electronics. The output of the signal conditioning electronics is converted to a digital format consistent with the data input requirements of the microprocessor which is programmed to perform the necessary algorithms to provide the control features of the system. The microprocessor of course controls the entire operation of the system and generates control signals which are used to control the power of the lamp and also controls the multiplexer. A calibration device can be provided which calibrates the memory of the entire array to the desirable light intensity levels allowing for differences in intensity for various areas of the controlled space based on the mapped matrix. It may be in the form of a separate, portable calibration sensor which can be interfaced directly with the microprocessing unit.

The system of the present invention accomplishes hot-spot compensation, contrast maintenance, elimination of lighting zone cross-talk and is easily augmented with automatic calibration/recalibration of the system. In addition, it may be programmed to compensate for the decreased illumination of aging lamps. While the preferred embodiment is associated with fluorescent illumination, of course, the system is readily adaptable to use with conventional incandescent or other forms of lighting. Also, the sensed matrix may be used to control a plurality of lighting units, each of which illuminates a portion of the controlled area.

BRIEF DESCRIPTION OF THE DRAWINGS

The single FIGURE is a block diagram of the illumination sensor and controlling system of the invention.

DESCRIPTION OF THE PREFERRED EMBODIMENT

The illumination sensing and controlling system of the invention depicted in the single FIGURE includes an element or device 10 for gathering ambient light from the area for which the illumination is sought to be controlled. The element or device 10 may be an inexpensive wide-angle lens or a fiber-optic bundle having fibers receiving light from as wide an area as desired. The light gathered by the lens 10 is transmitted to a two-dimensional, light-sensitive array 11 which may be a photodiode array or the like consisting of a sufficient number of light-intensity sensitive elements to control the intensity and maintain contrast in the desired area. The array output is fed into a multiplexer 12 which sequentially reads the light intensity value of each sensor array element into a set of signal conditioning electronics 13 whose analog output is converted to a digital format by an A/D converter 14. The digital information, in turn, is further processed by the microprocessor 15 together with all other necessary inputs to the microprocessor 15 which generates control signals which, in turn, are implemented by a calibration and control interface device 16. The calibration and control interface device 16 controls the light level of lamps as at 17 and 18 by means of a lamp power controller 19. The lamps illustrated in the FIGURE are fluorescent lamps together with dimming ballast 20, however, the system can readily be adapted to be used with incandescent lamps or other light sources.

A separate portable calibration sensor 21 may be provided to set up and calibrate the sensor/controller system. At the time of installation, illumination levels read by the sensor 21 are used to calibrate the two dimensional light sensor array output. Once this has been accomplished, recalibration is required only at re-lamping.

The use of the two-dimensional array in conjunction with wide angle ambient light sensing allows the system to assess the actual overall lighting situation of an area such as a work area with a great deal more accuracy than conventional systems. The array matrix of photodiodes is such that each diode's light-sensitive output can be addressed and read out by the multiplexer under the control of the microprocessor. In this manner the illumination levels of specific areas of the light-controlled area can readily be determined since each area is "mapped" into the array in the manner of an array of picture "pixels". This can be used to control a variety of important lighting considerations.

A comparison of the relative intensity of these elements or pixels from area to area identifies hot-spots associated with local glare or the presence of white or moving white objects such as a white shirt. The microprocessor is programmed to ignore the appearance of hot-spots in the matrix when such a comparison shows that the overall light level has not increased. This can be used to compensate for differences in clothing or reflective objects, for example, which occupy small portions of the controlled area. In addition, the appearance of hot-spots can be used to detect the presence or absence of people in the controlled area as persons sitting at desks or the like.

In addition, the system of the invention provides for the maintenance of contrast. It is well known that good contrast is as important as good light level to vision in a work area. This is done by maintaining the calibrated relative difference in light levels between the various areas of the mapped matrix. This maintains an optimal contrast level in the controlled area under all lighting conditions, and is especially beneficial when the work area is illuminated by a plurality of lighting units. In the maintenance of contrast, or balance for example, some units may be dimmed while others are turned up. This feature also allows a great deal of energy saving especially wherever a large amount of natural light is available.

The system also can be used to detect or determine when fluorescent lamps are near the end of their life. As these lamps age their lumen per watt output decreases, and when a predetermined minimum output is reached an "end-of-lamp-life" signal may readily be programmed into the system, realizing a significant increase in lamp life and a reduction in cost over current methods used to detect and relamp buildings.

Because each system is basically a "stand alone", individually programmed system, there is no need to couple it to any adjacent control systems. This eliminates problems associated with cross-talk or false signals from adjacent control zones.

We claim:

1. An illumination level sensing and controlling system for controlling the level of artificial light in an area of interest comprising:

light collector means capable of receiving light from a wide angle such that the light received is representative of a relatively large portion of said area of interest and focusing said light on a two-dimensional surface;

two-dimensional light-sensitive array means including a matrix of light-intensity sensitive elements disposed to receive the light focused by said light collector means in a manner such that the matrix of light-sensitive elements produces an output corresponding to a light-intensity mapping of the area from which said light is collected;

multiplexer means for addressing each of said light-intensity sensitive elements and determining the relative light intensity value thereof, said values being representative of the light intensity in corresponding portions of the controlled area;

signal conditioning means including means for digitizing said light intensity values;

microprocssor means for storing control values associated with desired light levels of the area of interest, processing the digitized data and controlling the operation and control functions of the system based on a comparison with said control values; and control means for controlling the light level of one or more lamps associated with the illumination of the area to be controlled based on the control function of said microprocessor means.

2. The system of claim 1 including means for identifying and ignoring local, unexpectedly high light intensity values transmitted by said light-intensity sensitive elements.

3. The system of claim 1 including means for comparing the relative intensities among the values transmitted by the elements of said light-sensitive array means such that desired contrast may be maintained between portions of the area, the light intensity of which is mapped.

4. The system of claim 1 including means for detecting relatively low lamp lumen per watt output indicating end of lamp life.

5. The system of claim 1 wherein said array is a photodiode array.

6. The system of claim 1 wherein said light collector means is a wide angle lens.

7. The system of claim 1 wherein said light collector means is a fiberoptic bundle having fibers disposed to collect light from diverse directions.

8. The system of claim 1 including calibration means for generating said control values and inputting said control values into said microprocessor means.

* * * * *